United States Patent [19]

O'Neil

[11] 4,343,522

[45] Aug. 10, 1982

[54] JUMPER CABLE SYSTEM FOR RAILWAY TRAINS

[75] Inventor: Paul T. O'Neil, Bethesda, Md.

[73] Assignee: National Steel Corporation, Pittsburgh, Pa.

[21] Appl. No.: 184,374

[22] Filed: Sep. 5, 1980

[51] Int. Cl.[3] ........................ H01R 13/60; B60D 1/08

[52] U.S. Cl. .......................................... 339/10; 307/9; 339/38; 339/44 M; 339/125 R; 339/28

[58] Field of Search ........... 339/10, 38, 119 C, 125 R, 339/29 R, 28, 44 R, 44 M; 280/422; 307/9 R; 191/11; 213/1, 6

[56] References Cited

U.S. PATENT DOCUMENTS

| | | | |
|---|---|---|---|
| 615,420 | 12/1898 | Baker | 339/10 |
| 762,684 | 6/1904 | Case | 339/10 |
| 3,915,476 | 10/1975 | Burkle | 280/422 |
| 4,017,136 | 4/1977 | Sasgen | 339/28 |

*Primary Examiner*—Eugene F. Desmond
*Attorney, Agent, or Firm*—Paul T. O'Neil; James L. Bean

[57] ABSTRACT

A system for electrically connecting two locomotives coupled in a consist and each having a pair of live electrical receptacles thereon located one at each end on opposite sides of the longitudinal vertical center plane includes an elongated jumper cable having connector heads at each end is permanently mounted on one end of the locomotive by an elongated flexible support having one end attached intermediate the connector heads. A pair of dummy receptacles are mounted one on each side of the locomotive in position to each have one of the connector heads of the permanently mounted jumper cable connected thereto so that, when not in use, the jumper cable extends generally across the end of the locomotive and has one end supported on each side portion thereof and its intermediate portion supported between the two dummy receptacles. To use the jumper cable to provide electrical connection between two coupled locomotives, the connector heads are disconnected from the dummy receptacles and one is connected to the permanently installed electrical receptacle on the locomotive on which the jumper cable is permanently mounted and the other connected to the permanently installed electrical receptacle on the adjacent end of the next locomotive. Alternatively, electrical connection can be provided between the locomotives by an independent, nonattached jumper cable, leaving the permanently attached jumper cable connected to the dummy receptacles.

8 Claims, 3 Drawing Figures

JUMPER CABLE SYSTEM FOR RAILWAY TRAINS

BACKGROUND OF THE INVENTION

1. Field of the Invention

This invention relates to electrical jumper cable system for railway trains, and more particularly to an improved jumper cable system including a jumper cable adapted to be permanently attached to one end of each locomotive for connecting live electrical receptacles on adjacent ends of coupled locomotives in a consist.

2. Description of the Prior Art

It is common practice to use a plurality of locomotives coupled together in a consist, with each locomotive assisting in pulling a train. The respective locomotives may be interconnected electrically to provide power therebetween and to enable a single crew in one locomotive to simultaneously actuate the controls of all locomotives in the consist. The electrical connections are conventionally provided by use of jumper cables which extend between and are releasably connected to permanently installed live receptacles on adjacent ends of the coupled locomotives to thereby provide power and/or control circuits between locomotives in the consist.

Jumper cable systems of the type described above, although capable of providing the necessary electrical connections between adjacent locomotives, have nevertheless not been entirely satisfactory due to the fact that the jumper cables themselves were a separate umit. As a result, cables were frequently lost or misplaced so that they were not always available when needed. Further, such separate jumper cables could be damaged in handling, storage, and the like and spare jumper cables were not always readily available.

One attempt to remedy the defect of the prior system is disclosed in U.S. Pat. No. 4,017,136. According to this prior patent, a modified jumper cable having a conventional connector head on one end has its other end permanently connected in the wiring system of the locomotive within a junction box rigidly bolted to and forming an extension of the conventional live receptacle. A second live receptacle is also provided on the junction box, and a dummy receptacle is mounted on the side of the locomotive opposite the side having the live receptable. A slideable clip supports the midsection of the jumper cable on the locomotive when the cable is not in use. To use the device, the jumper cable connector head was disconnected from the dummy receptacle and plugged into the live receptacle on the end of the adjacent locomotive in a consist. Alternatively, a conventional jumper cable could be used to connect the live receptacle on the junction box to the live receptacle on the second locomotive, in which case the connector head of the jumper cable remained connected to the dummy receptacle and the central portion supported by the slideable clip. While a jumper cable was always available in this arrangement, the structure was expensive, required modification of existing structure, and was not entirely satisfactory in that the jumper cable remained live at all times whether or not in use.

It is, accordingly, the primary object of the present invention to provide an improved jumper cable system for electrically connecting adjacent locomotives of a consist employing jumper cables permanently mounted on one end of the locomotives and which may be employed between the conventional live receptacles on the adjacent ends of the locomotives and to have its ends connected to dummy receptacles when not in use.

Another object of the invention is to provide such an improved jumper cable system which always assures the presence of a jumper cable on one end of each locomotive and which will not interfere with the use of a conventional jumper cable.

Another object is to provide such an improved jumper cable system which does not require modification of the conventional live receptacles on locomotives.

Another object is to provide such a jumper cable which is supported between two locomotives when in use and is supported in such manner when not in use as to protect the cable against damage.

In the attainment of the foregoing and other objects and advantages of the invention, an important feature resides in providing a jumper cable system including a jumper cable having means for permanent attachment at a point intermediate its ends to one end of a locomotive and adapted to have its connector heads releasably connected one to each of a pair of dummy receptacles mounted on the end portion of the locomotive one adjacent each side thereof whereby the permanently attached jumper cable is always safely stored and deenergized when not in use. A flexible support such as a length of chain or a flexible cable hanger has one end fixed on the midportion of the jumper cable and its other end portion permanently attached, as by welding, to the locomotive at a point between the two dummy receptacles which are spaced apart a distance sufficient to store the elongated jumper cable in two shallow loops extending generally across the end of the locomotive.

BRIEF DESCRIPTION OF THE DRAWINGS

Other objects and advantages of the invention will become apparent from the detailed description contained hereinbelow, taken in conjunction with the drawings, in which.

DESCRIPTION OF THE PREFERRED EMBODIMENTS

Figure 1:
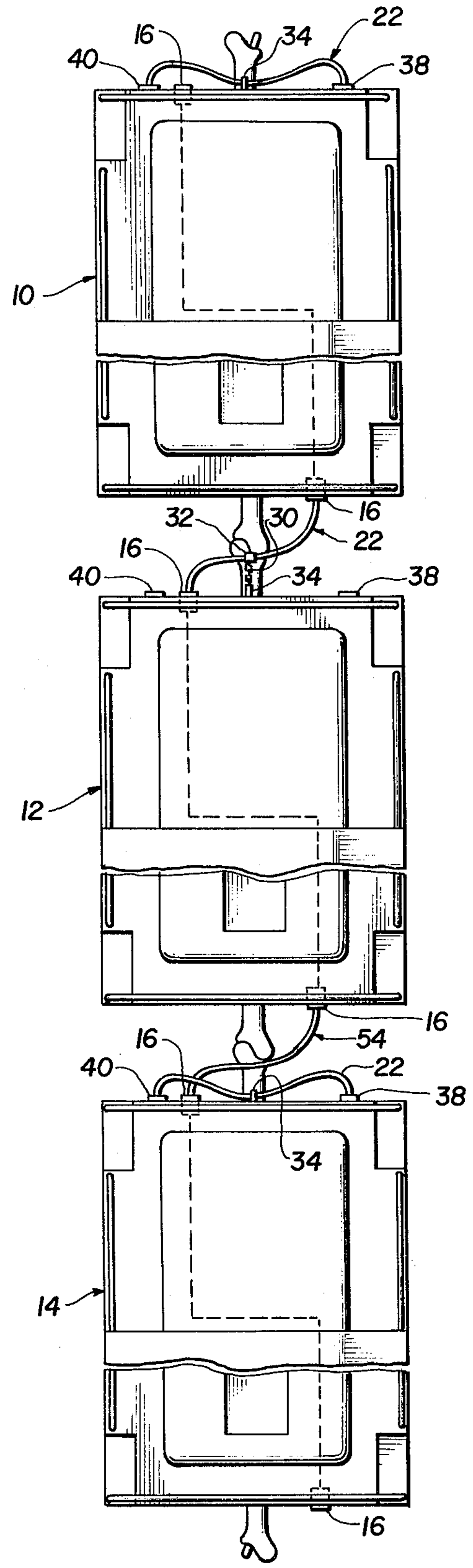
FIG. 1 is a fragmentary top plan view of a three-locomotive consist with each locomotive incorporating the jumper cable system of the present invention.
Figure 2:
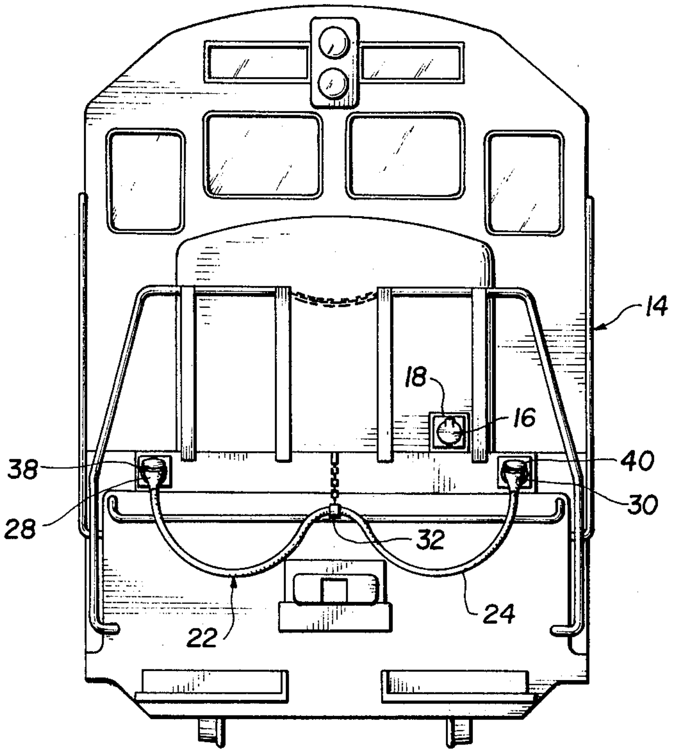
FIG. 2 is an elevation view of a jumper cable assembly according to the present invention illustrated as installed on the forward end of a locomotive.

Referring now to the drawings in detail, the jumper cable system according to the present invention is illustrated in FIG. 1 as being permanently mounted on the front end of each of three railway locomotives 10, 12, 14 coupled together in a consist. Each locomotive has a conventional live receptacle 16 on its front and rear ends. In the locomotives illustrated, the receptacles 16 are rigidly mounted on the front wall of a box-like housing 18. As shown in FIG. 2, the housing 18 on the front end of the locomotive is mounted on and projects upwardly from the front edge portion of the deck surface 20 of a catwalk extending across the front of the locomotive. As is conventional practice, the housing 18 and receptacle 16 on the front are offset a substantial distance to one side of the longitudinal vertical center plane of the locomotive and the housing and receptacle mounted on the rear are similarly offset to the opposite side. While the exact location of the live receptacles may differ in locomotives of different manufactures or different models of the same manufacture, the general arrangement described is conventional.

According to the present invention, a jumper cable assembly indicated generally at 22 is permanently mounted on the front end of each locomotive and is always available for use to provide electrical connection between two locomotives coupled together in a consist. Each cable assembly 22 includes a length of multiple-conductor electrical cable 24 having substantially identical connector heads 26, 28 on its opposed ends. In a typical jumper cable assembly employed to provide electrical connection between two locomotives in a consist, the conductor cable may include 27 individually insulated conductors contained within an external insulating sheathe.

The jumper cable assemblies 22 are permanently mounted on the front of the respective locomotives by a flexible support such as a length of chain 30 having one end permanently attached to cable 24 as by the clamp 32 at substantially the midsection of the cable and its other end to a bracket 34 rigidly welded, as at 36, to the front of the locomotive at a point located substantially on its vertical center plane.

Figure 3:
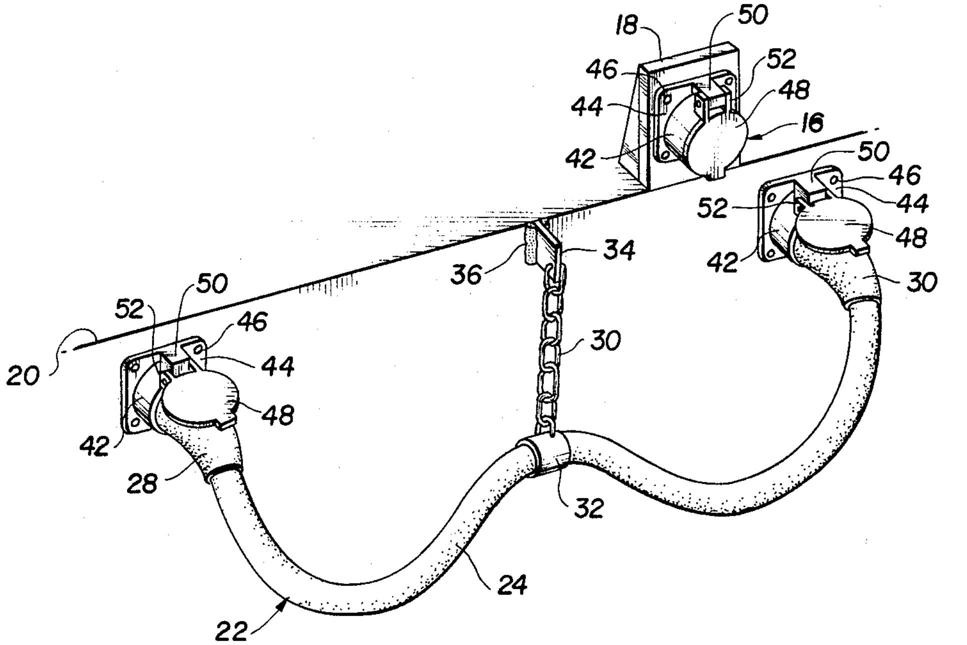
FIG. 3 is an enlarged perspective view of the jumper cable structure shown in FIG. 2.

A pair of dummy receptacles 38, 40 are mounted on the front end of the locomotive one on each side of the bracket 34 and spaced outwardly therefrom a substantial distance so as to be readily accessible from the respective sides of the locomotive. Dummy receptacles 38 and 40 may be identical and may be structurally similar to live receptacle 16 except, of course, that there are no live electrical connection in the dummy receptacles. Thus, as best seen in FIG. 3, each dummy and live receptacle includes a generally cylindrical, hollow metal body 42 integrally formed on a mounting flange 44 adapted to be rigidly joined, as by mounting bolts 46, to a generally vertical, flat surface on the locomotives. A cover plate 48 is pivotally mounted on an upstanding lug 50 on the top of the cylinderical body 42 as by hinge plates 52. Springs means, not shown, normally urge the cover 48 to the closed position to close and seal cylindrical body 42 when a connector head is not mounted on the receptacle. In the open position, cover 48 may also act to retain the connector heads 26, 28 against unintentional withdrawal from a live or dummy receptacle in which they are installed.

When the jumper cable assembly 22 is employed to provide electrical connection between live receptacles 16 on the adjacent front and back ends of two locomotives, e.g., locomotives 12 and 14 in FIG. 1, the connector head 28 is disconnected from the dummy receptacle 40 and plugged into the live receptacle 16 on locomotive 12. Connector head 26 is then disconnected from dummy receptacle 38 on locomotive 12 and plugged into the permanently installed live receptacle 16 on the back of locomotive 14. In this position, the flexible support chain 30 is free to swing forward from the weld bracket 34 so that an excessively long jumper cable is not required. At the seme time, the chain 30 supports a portion of the weight of the jumper cable between the two locomotives. If desired, the metal clamp 32 may be positioned slightly closer to the connector head 28 then to connector head 26.

When the improved jumper cable system is not being used to provide electrical connection between two locomotives, the connector heads on each end of the cable are supported by the dummy receptacles in the manner described. At the same time, a substantial portion of the weight of the jumper cable is supported by the flexible chain 30. This arrangement not only assures that the jumper cable is permanently attached to the locomotive but also that it is supported in a manner and position so that it is protected against damage and does not interfere with the use of other jumper cables to electrically connect locomotive in a consist as illustrated at 54 between locomotives 10 and 12 in FIG. 1.

In use, the jumper cable extends from a live receptacle spaced laterally to one side of the vertical center plane of one locomotive diagonally across to the live receptacle on the other side of the vertical center plane of the adjacent locomotive. Since the two live receptacles are spaced some distance from one another longitudinally of the locomotives, the length of the jumper cable must be somewhat longer than the transverse spacing of the two live receptacles on a locomotive. Also, relative movement of the locomotives and movement of the jumper cable during use makes it necessary for the jumper cable to be somewhat longer than a direct line between the connected live receptacles in order to avoid excessive strain on the cable and on the connection between the connector heads and the live receptacles. To accomodate this length of jumper cable in the stored position, the dummy receptacles are preferably spaced from the longitudinal vertical center plane of the locomotives a distance which is at least slightly greater than that of the live receptacles. At the same time, the spacing between the dummy receptacles is selected to be somewhat less than the length of the jumper cable so that the cable tends to hang losely between the two dummy receptacles when the connector heads are supported therein and the central portion of the cable is hereby supported by the flexible support element and the cable does not place substantial load or strain on the dummy receptacles.

The length of the flexible support element is also selected so that, when the jumper cable is connected between live receptacles on two locomotives, the lower end of the flexible support element will swing rearwardly to support the central portion of the jumper cable at a location spaced between the coupled locomotives. The length of the flexible support element and the vertical position at which it is attached to the locomotive are also selected so that the central portion of the jumper cable is supported in the stored or non-use position as described above.

While I have disclosed and described a preferred embodiment of my invention, I wish it understood that I do not intend to be restricted solely thereto but rather that I do intend to include all embodiments thereof which would be apparent to one skilled in the art and which come within the spirit and scope of the invention.

I claim:

1. In combination, a first locomotive unit and a second locomotive unit mechanically coupled together in a consist, the first locomotive unit and the second locomotive unit each including first and second live electrical receptacle mounted on the front end and rear end, respectively of the locomotive unit, the first and second live electrical receptacles being located on opposite sides of the longitudinal vertical center plane of the locomotive unit, an elongated jumper cable having a first end and a second end, an elongated flexible support element, means permanently connecting one end of the elongated flexible support element to the front end of the second locomotive unit adjacent the region of the longitudinal vertical center plane of the second locomotive unit, means permanently attaching the other end of the elongated flexible support element to the elongated jumper cable intermediate the ends thereof, a first dummy receptacle and a second dummy receptacle each permanently mounted on the front end of the second locomotive unit, the first dummy receptacle being mounted adjacent one side of the second locomotive unit displaced in one direction from the longitudinal vertical center plane of the second locomotive unit, the second dummy receptacle being mounted adjacent the other side of the second locomotive unit displaced in an opposite direction from the longitudinal vertical center plane of the second locomotive unit, the elongated jumper cable including a connector head at one of its ends adapted to be received by the first live electrical receptacle mounted on the front end of the second locomotive unit and adapted to be received by the first dummy receptacle, the elongated jumper cable including a connector head at its other end adapted to be received by the second live electrical receptacle at the rear end of the first locomotive unit and adapted to be received by the second dummy receptacle, the length of the elongated jumper cable and the length of the elongated flexible support element being selected relative to the distance between the first live electrical receptacle mounted on the front of the second locomotive unit and the second live electrical receptacle mounted on the rear of the first locomotive unit so that when the elongated jumper cable is used to electrically connect the first and second locomotive units the elongated jumper cable is supported intermediate its ends by the elongated flexible support element and its adapted to be supported by the live electrical receptacles on the front of the second locomotive unit and on the rear of the first locomotive unit, and the length of the elongated jumper cable and the length of the elongated flexible support element being selected relative to the distance between the first dummy receptacle and the second dummy receptacle so that the elongated jumper cable when not used to form an electrical connection between the first and second locomotive units is supported intermediate its ends by the elongated flexible support element and is adapted to be supported at its ends by the dummy receptacles.

2. The combination defined in claim 1 wherein said flexible support element comprises a sleeve member permanently mounted on the jumper cable and an elongated metal chain having one end permanently connected to the sleeve and the other end permanently attached to the locomotive.

3. The combination defined in claim 2 wherein said metal chain is attached to the locomotive at a point substantially on the longitudinal vertical center plane of the locomotive.

4. The combination defined in claim 1 further comprising closure means for closing the dummy receptacles when the connector heads of the jumper cable are not received therein.

5. The combination defined in claim 1 wherein the first and second dummy receptacles are each spaced from the longitudinally vertical center plane of the second locomotive a distance greater than the spacing of the first and second live electrical receptacles from the longitudinal vertical center plane of the locomotive.

6. The combination defined in claim 5 wherein said flexible support element comprises a sleeve member permanently mounted on the jumper cable and an elongated metal chain having one end permanently connected to the sleeve and the other end permanently attached to the locomotive.

7. The combination defined in claim 6 wherein said metal chain is attached to the locomotive at a point substantially on the longitudinal vertical center plane of the locomotive.

8. The combination defined in claim 7 further comprising closure means for closing the dummy receptacles when the connector heads of the jumper cable are not received therein.

* * * * *

UNITED STATES PATENT AND TRADEMARK OFFICE

CERTIFICATE OF CORRECTION

PATENT NO. : 4,343,522

DATED : August 10, 1982

INVENTOR(S) : Paul T. O'Neil

It is certified that error appears in the above-identified patent and that said Letters Patent are hereby corrected as shown below:

Col. 1, line 31, correct the spelling of "unit".

Col. 3, line 34, change "connection" to --connections--;

line 41, correct the spelling of "cylindrical";

line 61, change "seme" to --same--.

Col. 5, line 46, cancel "its" and insert --is--.

Signed and Sealed this

*Twenty-ninth* Day of *March 1983*

[SEAL]

*Attest:*

GERALD J. MOSSINGHOFF

*Attesting Officer* *Commissioner of Patents and Trademarks*